Dec. 4, 1962 J. BAUDE 3,067,338

CASCADED-TRANSISTOR SWITCH HAVING DIODE THERMAL-RUNAWAY PROTECTION AND SWITCHING SURGE ELIMINATION MEANS

Filed Dec. 29, 1958

WITHOUT RESISTOR 74, CAPACITOR 73 — WITH RESISTOR 74, CAPACITOR 73

TRANSISTOR 10

TRANSISTOR 11

TRANSISTOR 12

TRANSISTOR 13

Inventor
John Baude
by Carl A. Laurnont
Attorney

United States Patent Office 3,067,338

Patented Dec. 4, 1962

3,067,338

CASCADED-TRANSISTOR SWITCH HAVING DIODE THERMAL-RUNAWAY PROTECTION AND SWITCHING SURGE ELIMINATION MEANS

John Baude, Milwaukee, Wis., assignor to Allis-Chalmers Manufacturing Company, Milwaukee, Wis.

Filed Dec. 29, 1958, Ser. No. 783,563
11 Claims. (Cl. 307—88.5)

This invention relates generally to transistor switches and in particular to that type of switch designed to control currents or voltage in excess of the ratings of the individual transistors.

The application of transistors as switches has been limited due to the high price or unavailability of transistors capable of handling the voltages and currents involved in industrial control applications. It is not unusual to increase the voltage handling ability of transistors by connecting them in a cascade circuit to divide the voltage between the transistors but the prior art devices have serious limitations.

The problem of thermal runaway at elevated temperatures exists in many of the prior art circuits. While it is true that a transistor may be easily biased to prevent thermal runaway this has generally required a power source separate from that which is controlled by the transistor. The requirement of a separate power source is a distinct disadvantage where a transistor switch is to be employed because of the additional size, cost and the decrease in reliability due to the increasing number of component parts.

A shortened response time materially improves the current handling ability of a transistor switch. The current which a transistor can handle at saturation is much greater than its current capacity in the more linear region. Since the power dissipated within the transistor is responsive to the product of the voltage across the transistor and the current through it, internal dissipation can be kept to a minimum if one of these factors is held to a small value. A transistor switch accomplishes this by reducing the voltage drop across the transistor to a very small value during the time the switch is closed and the current is high. Reducing the current to a small value has the same effect when the switch is open.

During the changeover between conducting and nonconducting states, the internal dissipation becomes quite large since both current and voltage have appreciable value. The faster the switch accomplishes a changeover, the less chance there is that the internal dissipation rating will be exceeded. While maximum power handling rating is therefore increased for switching purposes, it necessarily remains a function of switching frequency.

Reduction of the switching time tends to increase the amplitude of transients induced across the switch. These induced voltages may have a harmful effect and should be eliminated.

My novel method of eliminating the transient voltages provides a transistor switch with very good high frequency response. Since the rise time for the switch is approximately 10 microseconds it is adaptable to many pulse applications. My invention provides a high gain transistor switch in which a minimum of control power is required and which contains a novel biasing arrangement to avoid the necessity for a separate bias supply and the resultant consumption of large amounts of power during the standby period. The circuit of my invention provides complete protection against thermal runaway of any of the transistors contained therein and also provides a high gain to accomplish rapid switching with a minimum of components.

It is therefore an object of my invention to provide a new and improved high speed transistor switch capable of handling voltages in excess of the individual ratings of the transistors.

It is another object of my invention to provide a transistor switch in which the possibility of thermal runaway of any of the transistors is reduced to a minimum.

A further object of my invention is to provide a transistor switch having a short switching time and very small transient voltages induced across the switches.

It is a further object of my invention to provide a transistor switch having a short switching period.

Still another object of my invention is to provide a transistor switch in which the biasing power for all transistors is derived directly from the circuit being controlled and which requires a minimum amount of biasing power.

An additional object of my invention is to provide a transistor switch able to handle large amounts of power at pulse frequencies.

Other objects and advantages of this invention will become apparent from the following description taken in connection with the accompanying drawings, wherein are set forth by way of illustration and example certain embodiments of this invention.

Figure 1:
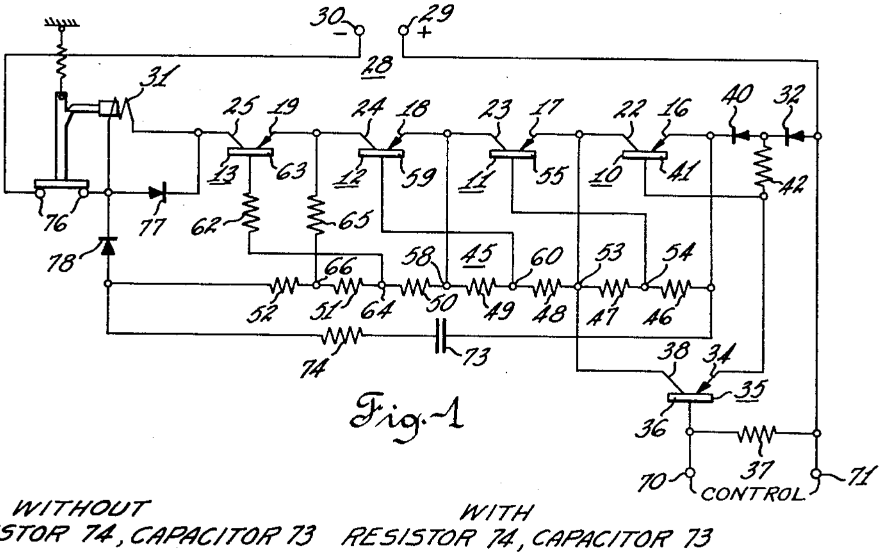
FIG. 1 is a schematic drawing of a circuit embodying my invention.

The basic form of my invention consists of a group of transistors 10, 11, 12 and 13 having their emitters 16, 17, 18 and 19 and collectors 22, 23, 24 and 25 in cascade circuit to control the flow of current from source 28 to load 31. The minimum number N of cascade connected transistors required to control a voltage E should be $$N=\frac{E}{V_{CEmax}}$$

where $V_{CEmax}$ is the maximum voltage between the emitter and collector which the individual transistors can withstand without failure. Where all the transistors do not have the same $V_{CEmax}$ the sum of the $V_{CEmax}$ of all the cascade connected transistors should be at least as great as the source voltage.

Diode 32 is inserted into the circuit between the positive side 29 of direct current source 28 and emitter 34 of trigger transistor 35. Resistor 37 connects the positive side 29 of source 28 to base 36 of control transistor 35. Diode 32 is polarized for current flow in the forward direction and has the characteristic of assuming a more or less constant voltage drop for currents exceeding a minimum value.

With the voltage drop occurring in the lead to emitter 34, base 36, being connected to the positive side 29 of direct current source 28 through resistor 37, will be more positive than emitter 34 and the circuit comprising emitter 34 and collector 38 will be cut off.

Diode 40 connects emitter 16 of control transistor 10 to the positive side 29 of direct current source 28 through diode 32. Base 41 is connected to the positive side 29 of source 28 through resistor 42 and diode 32. The emitter 16-collector 22 circuit of transistor 10 is cut off by the bias voltage developed across diode 40. This voltage makes base 41 positive with respect to emitter 16. Diode 40 permits base 41 to be maintained at a more positive potential than emitter 16 without requiring an outside power source or introducing a loss in gain or power handling ability.

It will be recognized that the proper bias voltage for a variety of transistors may be obtained by connecting diodes in series or by using diodes with the particular characteristic desired. The voltage drop across the diodes 32 and 40 will be present when the switch is open since voltage divider circuit 45 draws current through diodes 32 and 40 and the leakage current through transistors 10, 11, 12 and 13 must also pass through. The drop will normally be small in comparison to the voltage being controlled and therefore not objectionable even though it is present when the switch is closed. In any event, the source voltage may be increased sufficiently to overcome the losses in diodes 32 and 40 if the higher voltage is required.

Extending from the negative side of diode 40 to the negative side 30 of source 28 is a voltage divider 45 made up of cascade connected resistors 46, 47, 48, 49, 50, 51 and 52. Voltage divider circuit 45 is used to bias transistors 11, 12 and 13 in the cascade connected circuit. For example, transistor 11 in the cascade circuit has emitter 17 connected to junction 53 which is more negative than junction 54 to which base 55 is connected. Since base 55 is more positive than emitter 17, transistor 11 will be cut off. Therefore, no current will flow from emitter 17 to collector 23.

In a similar manner, transistor 12 has its emitter 18 connected to junction 58 on voltage divider 45 and base 59 is connected to junction 60 on voltage divider 45. Junction 60 is at a more positive potential than junction 58 so transistor 12 is cut off and no current will flow from emitter 18 to collector 24.

Transistor 13 in the cascade connected circuit has resistor 62 connecting base 63 to junction 64 on voltage divider 45. Resistor 65 connects emitter 19 to junction 66 on the voltage divider 45. Since base 63 is more positive than emitter 19, emitter 19-collector 25 circuit is cut off and no current will flow. With the emitter-collector circuits of transistors 10, 11, 12 and 13 cut off, no current flows and load 31 remains deenergized.

When a negative signal appears between input terminals 70 and 71 across resistor 37, that is to say, a signal which makes base 36 of trigger transistor 35 negative with respect to emitter 34, transistor 35 will conduct between emitter 34 and collector 38.

Emitter 34 and collector 38 are connected to base 41 and collector 22, respectively, of transistor 10. When conduction occurs between emitter 34 and collector 38, base 41 of transistor 10 is effectively shorted to collector 22, causing transistor 10 to conduct between emitter 16 and collector 22. When transistor 10 conducts as described, emitter 17 of transistor 11 will be at a potential almost equal to that of wire 29 of source 28. The voltage drop across transistor 10 accounts for the difference that exists.

With emitter 17 being at an elevated potential with respect to base 55 transistor 11 will conduct from emitter 17 to collector 23 since emitter 17 is more positive than base 55. This is obvious from the fact that a path from emitter 17 to base 55 includes a voltage drop across resistances 47 or 46 and the drop within the transistor 11 from emitter 17 to base 55. This voltage drop drives transistor 11 to saturation.

Transistor 12 conducts between emitter 18 and collector 24 due to the high positive potential impressed on emitter 18 by conduction through transistor 11. Here again any path from emitter 18 to base 59 includes a voltage drop which drives the transistor 12 to saturation.

Transistor 13 is a repetition of the preceding stages except that resistors 62 and 65 are included in the base 63 and emitter 19 circuits, respectively.

At the point where all the transistors are conducting, source 28 energizes load 31. In a typical application of my invention, load 31 would be the trip coil for a circuit breaker. Contacts 76 represent auxiliary contacts on the breaker which open in response to opening of the main contacts. Once the trip coil 31 has been energized and the main circuit breaker contacts and contacts 76 are opened, the transistor switch is sealed in the open position.

Interruption of the current to load 31 by the opening of switch 76 produces an induced voltage across load 31 tending to sustain the current through the load. Diode 77 is connected in parallel to load 31 and polarized to oppose the normal flow of load current and act as a low impedance shunt to the induced voltage across the load.

Diode 78 is connected in series with the bias circuit 45 to block the flow of current caused by the induced voltage but allow the passage of the bias current.

FIGS. 2 through 5 represent the voltages between the emitter and collector electrodes of transistors 10 through 13, respectively, after the contacts 76 are opened. The curves show that there is a voltage induced across the transistors by the energy stored in load 31. This voltage may not be produced in the case where load 31 is nonreactive. The reverse voltage across transistors 11, 12 and 13 has a peak of relatively high amplitude. One explanation for these peaks is that when the contacts 76 open there is no longer any base current flowing to make these transistors conductive so they cut off and cause the peaks to appear. The curves show that the induced voltage is largest across the transistor closest to the load and this is in accord with the theory.

Elimination of these transients by capacitors between the emitter and collector would have a detrimental effect upon the response time of the switch. By adding capacitor 73 and resistor 74 in parallel with bias circuit 45 it has been found possible to substantially eliminate the transients. The voltages between the emitters and collectors of transistors 10 through 13 with capacitor 73 and resistor 74 in the circuit are shown in FIGS. 6 through 9, respectively. The peaks observable in FIGS. 3, 4 and 5 have been eliminated in FIGS. 7, 8 and 9.

Figure 2:
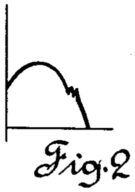
FIGS. 2 through 9 show the effect of the invention on the voltages developed across the transistor.
Figure 6:
Figure 3:
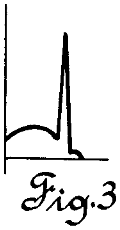
Figure 7:
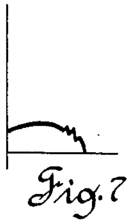
Figure 4:
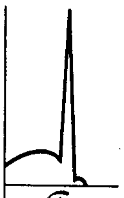
Figure 8:
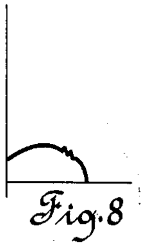
Figure 5:
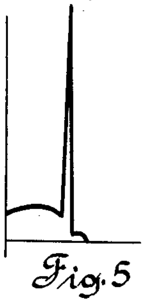
Figure 9:
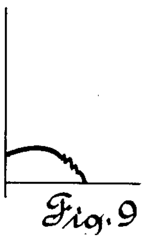

The lack of any peak in FIG. 2 may be explained by the fact that the input signal across resistor 37 provides sufficient base current to transistor 35 to allow transistor 10 to maintain a low impedance between collector 22 and base 41 which prevents appreciable voltage from existing between emitter 16 and collector 22.

The resistor 74 has been found to improve the switch operation over the capacitor alone. Elimination of the resistor 74 tends to produce erratic operation on initial energization of the circuit. This is apparently due to a reversal of the bias voltage caused by the current drawn in charging capacitor 73. Slowing the charging rate by means of resistor 74 has the effect of restoring stability to the switch.

Removal of the negative input signal across resistor 37 after contacts 76 are reclosed has the effect of restoring the cutoff bias between emitter 34 and base 36 of transistor 35. Transistor 35 ceases the conduct between emitter 34 and collector 38 and thereby restores transistor 10 to the cutoff condition. When conduction between emitter 16 and collector 22 ceases, the positive potential is removed from emitter 17 and transistor 11 also is cut off.

Transistors 12 and 13 are successively cut off as the positive potential is removed from their respective emitters and cutoff bias is again restored between the emitter and base of the respective transistors.

In the case where this switch is to be used as an amplifier contacts 76 will be absent and the transient voltages across the transistors will be further minimized since the source of the base current is not interrupted. The short rise time of approximately 10 microseconds allows the switch to be used in many high power applications which formerly required vacuum tubes.

What is claimed is:

1. In a switch, a plurality of transistors for switching current, each of said transistors having an emitter, a base, and a collector, a load circuit, a source having an output voltage exceeding that permissible between the individual emitters and collectors of said transistors, circuit means connecting the emitter and collector of said transistors in cascade circuit, means connecting said cascade circuit to control the flow of current from said source to said load circuit, a biasing circuit comprising a voltage divider energized by said source, a capacitor in parallel circuit with said voltage divider for supplying current to said switch during switching, individual circuit means connecting the base and emitter of each transistor to its individual predetermined point on said voltage divider to bias said transistors in the nonconductive state and to divide the voltage drop between said emitters and collectors in a predetermined manner, a control transistor and a trigger transistor, said control transistor and said trigger transistor each having an emitter, a base, and a collector, means connecting the emitter and collector of said control transistor into said cascade circuit, means connecting the emitter and collector of said trigger transistor between the collector and base of said control transistor, a resistance connecting the base and the emitter of said control transistor to bias said control transistor to a nonconducting state, means for initiating conduction through the emitter-collector circuit of said trigger transistor and said resistance to bring said cascade connected transistors into a state of conduction.

2. In a switch, a plurality of transistors for switching current, each of said transistors having an emitter, a base, and a collector, a load circuit, a source having an output voltage exceeding that permissible between the individual emitters and collectors of said transistors, circuit means connecting the emitter and collector of said transistors in cascade circuit, means connecting said cascade circuit to control the flow of current from said source to said load circuit, a biasing circuit for said transistors comprising voltage divider means, means connecting said divider means to be energized by said source, a capacitor in parallel circuit with said voltage divider for supplying current to said switch during switching, circuit means connecting the bases and emitters of said transistors to said voltage divider in a manner to place the individual bases at a potential, relative to their corresponding emitters, which blocks the flow of current in the emitter-collector circuit and divides the voltage drop between said emitters and collectors in a predetermined manner, a control transistor and a trigger transistor, said control transistor and said trigger transistor each having an emitter, a base, and a collector, means connecting the emitter and collector of said control transistor into said cascade circuit, means connecting the emitter and collector of said trigger transistor between the collector and base of said control transistor, a resistance connecting the base and the emitter of said control transistor to bias said control transistor to a nonconducting state, means for initiating conduction through the emitter-collector circuit of said trigger transistor and said resistance to bring said cascade connected transistors into a state of conduction.

3. In a switch, a plurality of transistors for switching current, each of said transistors having an emitter, a base, and a collector, a load circuit, a source having an output voltage exceeding that permissible between the individual emitters and collectors of said transistors, circuit means connecting the emitter and collector of said transistors in cascade circuit, means connecting said cascade circuit to control the flow of current from said source to said load circuit, a biasing circuit comprising a voltage divider energized by said source, a capacitor in parallel circuit with said voltage divider for supplying current to said switch during switching, circuit means connecting the emitter of each transistor to individual predetermined points on said voltage divider, circuit means connecting the base of each transistor to individual predetermined points on said voltage divider, said predetermined points so located as to bias said transistors to cut off and to divide the voltage drop between said emitters and collectors in a predetermined manner, a control transistor and a trigger transistor, said control transistor and said trigger transistor having an emitter, a base, and a collector, means connecting the emitter and collector of said control transistor into said cascade circuit, means connecting the emitter and collector of said trigger between the collector and base of said control transistor, a resistance connecting the base and the emitter of said control transistor to bias said control transistor to a nonconducting state, means for initiating conduction through the emitter-collector circuit of said trigger transistor and said resistance to bring said cascade connected transistor into a state of conduction.

4. In a switch, a plurality of transistors for switching current, each of said transistors having an emitter, a base, and a collector, a load circuit, a source having an output voltage exceeding that permissible between the individual emitters and collectors of said transistors, circuit means connecting the emitter and collector of said transistors in cascade circuit, means connecting said cascade circuit to control the flow of current from said source to said load circuit, a biasing circuit comprising a voltage divider energized by said source, a capacitor in parallel circuit with said voltage divider for supplying current to said switch during switching, individual circuit means connecting the base and emitter of each transistor to its individual predetermined point on said voltage divider to bias said transistors in a nonconductive state and to divide the voltage drop between said emitters and collectors in a predetermined manner, a control transistor and a trigger transistor, said control transistor and said trigger transistor having an emitter, a base, and a collector, means connecting the emitter and collector of said control transistor into said cascade circuit, means connecting the emitter and collector of said trigger transistor between the collector and base of said control transistor, a diode in series with the emitter of said control transistor, circuit means connecting the base of said control transistor to the side of said diode away from the emitter of said transistor to create a voltage difference between the emitter and base tending to cut off said control transistor, means for initiating conduction through the emitter-collector circuit of said trigger transistor to bring said cascade connected transistors into a state of conduction.

5. In a switch, a plurality of transistors for switching current, each of said transistors having an emitter, a base, and a collector, a load circuit, a source having an output voltage exceeding that permissible between the emitter and collector of the individual transistors, circuit means connecting the emitter and collector of said transistors in cascade circuit, means connecting said cascade circuit to control the flow of current from said source to said load circuit, a biasing circuit for said transistors comprising voltage divider means, means connecting said divider means to be energized by said source, a capacitor in parallel circuit with said voltage divider for supplying current to said switch during switching, circuit means connecting the bases and emitters of said transistors to said voltage divider in a manner to place the individual bases at a potential, relative to their corresponding emitters, which blocks the flow of current in the emitter-collector circuit and divides the voltage drop between said emitters and collectors in a predetermined manner, a control transistor and a trigger transistor, said control transistor and said trigger transistor each having an emitter, a base, and a collector, means connecting the emitter and collector of said control transistor into said cascade circuit, means connecting the emitter and collector of said trigger transistor between the collector and base of said control transistor, a diode in series with the emitter of said control transistor, circuit means connecting the base of said control transistor to the side of said diode away from the emitter of said control transistor to create a voltage difference between the emitter and base tending to cut off said control transistor, means for initiating conduction through the emitter-collector circuit of said trigger transistor to bring said cascade connected transistors into a state of conduction.

6. In a switch, a plurality of transistors for switching current, each of said transistors having an emitter, a base, and a collector, a load circuit, a source having an output voltage exceeding that permissible between the emitter and collector of the individual transistors, circuit means connecting the emitter and collector of said transistors in cascade circuit, means connecting said cascade circuit to control the flow of current from said source to said load circuit, a biasing circuit comprising a voltage divider energized by said source, a capacitor in parallel circuit with said voltage divider for supplying current to said switch during switching, circuit means connecting the emitter of each transistor to individual predetermined points on said voltage divider, circuit means connecting the base of each transistor to individual predetermined points on said voltage divider to bias said transistors to cut off and to divide the voltage drop between said emitters and collectors in a predetermined manner, a control transistor and a trigger transistor, said control transistor and said trigger transistor each having an emitter, a base, and a collector, means connecting the emitter and collector of said control transistor into said cascade circuit, means connecting the emitter and collector of said trigger transistor between the collector and base of said control transistor, a diode in series with the emitter of said control transistor, circuit means connecting the base of said control transistor to the side of said diode away from the emitter of said control transistor to create a voltage difference between the emitter and base tending to cut off said control transistor, means connected to the emitter and base of said trigger transistor for initiating conduction through the emitter-collector circuit of said trigger transistor to bring said cascade connected transistors into a state of conduction.

7. In a switch, a plurality of transistors for switching current, each of said transistors having an emitter, a base, and a collector, a source of current, circuit means connecting the emitters and collectors of said transistors in cascade circuit to control the flow of current from said source, a bias circuit for said transistors comprising a voltage divider, means connecting said voltage divider to be energized by said source, a capacitor, means connecting said capacitor in parallel circuit with said switch for momentarily sustaining control current through said switch.

8. In a switch, a plurality of transistors for switching current, each of said transistors having an emitter, a base, and a collector, a source of current, circuit means connecting the emitters and collectors of said transistors in cascade circuit to control the flow of current from said source, means responsive to the flow of current from said source for disconnecting said switch from said source, a bias circuit for said transistors comprising a voltage divider, means connecting said voltage divider to be energized by said source, a capacitor, means connecting said capacitor in parallel circuit with said switch for momentarily sustaining control current through said switch after said switch is disconnected from said source of current.

9. In a switch, a plurality of transistors for switching current, each of said transistors having an emitter, a base, and a collector, a source of current, circuit means connecting the emitters and collectors of said transistors in cascade circuit, means connecting said cascade circuit to control the flow of current from said source, a voltage divider bias circuit energized from said source, a capacitor, means connecting said capacitor in parallel circuit with said switch for momentarily sustaining control current through said switch, circuit means connecting said emitters to said bias circuit, circuit means connecting said bases to said bias circuit at a point displaced from the point of connection of its respective emitter to bias said transistor to cutoff, a control transistor, said control transistor having an emitter, a base, and a collector, means connecting the emitter and collector of said control transistor into said cascade circuit adjacent said source, means for initiating conduction through said control transistor to place the emitter of one of said plurality of transistors at a potential, relative to its base, to initiate conduction through its emitter-collector circuit whereby said cascade circuit is made conductive.

10. A device according to claim 9 in which the means for initiating conduction through said control transistor comprises a trigger transistor, said trigger transistor having an emitter, a base, and a collector, means connecting the emitter of said trigger transistor to the base of said control transistor, means connecting the collector of said trigger transistor to the collector of said control transistor, means connected between the emitter and base of said trigger transistor for initiating conduction through said trigger transistor whereby said control transistor is made conductive through its emitter-collector circuit.

11. A device according to claim 10 including bias means for said control transistor and said trigger transistor comprising diode means in series with the emitter of said control transistor, circuit means connecting the base of said control transistor to said diode to impress the voltage drop across said diode between the emitter and base of said control transistor tending to cut off said control transistor, second diode means in series with the emitter of said trigger transistor, circuit means connecting the base of said trigger transistor to said second diode means to impress the voltage drop across said second diode between the emitter and base of said trigger transistor tending to cut off said trigger transistor.

References Cited in the file of this patent

UNITED STATES PATENTS

| | | |
|---|---|---|
| 2,811,590 | Doremus et al. | Oct. 29, 1957 |
| 2,835,929 | Sourgens et al. | May 20, 1958 |
| 2,864,904 | Jensen | Dec. 16, 1958 |

OTHER REFERENCES

Fisk: "Transient Analysis in Electrical Engineering," page 54, Prentice-Hall, New York, 1955.